(12) United States Patent
Hu et al.

(10) Patent No.: US 11,987,699 B1
(45) Date of Patent: May 21, 2024

(54) SHEAR THICKENING COMPOSITE MATERIAL, PREPARATION METHOD THEREFOR, AND USE THEREOF

(71) Applicant: Huangshan Jiushi Technology Development Co., Ltd, Huangshan (CN)

(72) Inventors: Haoran Hu, Huangshan (CN); Hongxia Fang, Huangshan (CN); Xiaomei Luo, Huangshan (CN); Zhongqin Zhang, Huangshan (CN)

(73) Assignee: HUANGSHAN JIUSHI TECHNOLOGY DEVELOPMENT CO., LTD, Huangshan (CN)

( * ) Notice: Subject to any disclaimer, the term of this patent is extended or adjusted under 35 U.S.C. 154(b) by 0 days.

(21) Appl. No.: 18/448,991

(22) Filed: Aug. 14, 2023

(30) Foreign Application Priority Data

Nov. 7, 2022 (CN) .......................... 202211381440.7

(51) Int. Cl.
| | |
|---|---|
| *C08L 75/08* | (2006.01) |
| *A41D 13/06* | (2006.01) |
| *C08J 9/00* | (2006.01) |
| *C08J 9/04* | (2006.01) |
| *C08J 9/12* | (2006.01) |
| *C08K 3/04* | (2006.01) |
| *C08K 5/544* | (2006.01) |

(52) U.S. Cl.
CPC ............ *C08L 75/08* (2013.01); *A41D 13/065* (2013.01); *C08J 9/0061* (2013.01); *C08J 9/0066* (2013.01); *C08J 9/125* (2013.01); *C08K 3/04* (2013.01); *C08K 5/544* (2013.01); *C08J 2201/022* (2013.01); *C08J 2203/10* (2013.01); *C08J 2375/08* (2013.01); *C08J 2483/12* (2013.01); *C08L 2203/14* (2013.01); *C08L 2312/00* (2013.01)

(58) Field of Classification Search
CPC .. C08L 75/08; C08L 2203/14; C08L 2312/00; A41D 13/065; C08J 9/0061; C08J 9/0066; C08J 9/125; C08J 2201/022; C08J 2203/10; C08J 2375/08; C08J 2483/12; C08K 3/04; C08K 5/544
See application file for complete search history.

(56) References Cited

U.S. PATENT DOCUMENTS 5,232,956 A * 8/1993 Gabbard ................ C08J 9/0014
521/107

FOREIGN PATENT DOCUMENTS

| CA | 2013848 | * | 10/1999 |
| CN | 106632962 A | | 5/2017 |
| CN | 114395105 A | | 4/2022 |
| DE | 3621264 | * | 1/1988 |
| EP | 0551636 | * | 7/1993 |

* cited by examiner

*Primary Examiner* — K. Boyle
(74) *Attorney, Agent, or Firm* — Andrew C. Cheng

(57) ABSTRACT

The present invention relates to the technical field of polymer composite materials, and specifically, to a shear thickening composite material, a preparation method therefor, and use thereof. According to the present invention, a solid composite material with shear thickening performance is prepared by limiting the types and contents of all components in raw materials. This composite material is kept soft and has a proper elastic shape under a normal state, and can be rapidly subjected to strain enhancement through local density increase when being rapidly and violently impacted or extruded, so that a significant shear thickening phenomenon is presented, namely this material is a hard solid when being impacted by an external force, then this material has an increasing strength with the increase of the external force, and this material restores to an original relaxed, soft, and elastic state when the external force is removed.

9 Claims, No Drawings

SHEAR THICKENING COMPOSITE MATERIAL, PREPARATION METHOD THEREFOR, AND USE THEREOF

CROSS-REFERENCE TO RELATED APPLICATION

This application is claimed priority to Chinese Patent Application No. 202211381440.7 entitled "SHEAR THICKENING COMPOSITE MATERIAL, PREPARATION METHOD THEREFOR, AND USE THEREOF" and filed on Nov. 7, 2022, the content of which is hereby incorporated by reference in its entirety.

BACKGROUND

Technical Field

The present invention relates to the technical field of polymer composite materials, and specifically, to a shear thickening composite material, a preparation method therefor, and use thereof.

Description of Related Art

A shear thickening fluid is a typical non-Newtonian fluid, which is a collective name of a series of liquids with a viscosity that is rapidly and greatly improved along with the increase of a shear rate. The shear thickening fluid has gradually attracted attention of the academic community in recent years due to the significant characteristic that the apparent viscosity and the dynamic response characteristic of the fluid have great differences under different shear strain rates.

The shear thickening fluid can undergo liquid-solid transformation under the action of an external force to buffer external energy, so that the shear thickening fluid is mainly used in military army armors, tank armors, damping reducers, sports cushioning materials, and the like. Currently reported shear thickening fluid materials are mainly suspension systems and gel systems. The suspension systems (such as nano or bio-based suspensions) consist of dispersed phase particles and medium phases, and the suspension systems have problems such as uneasy portability, poor stability, difficult modification, poor transparency, and easy phase separation; the gel fluid is a three-dimensional network structure gel, and the high-strength high-hydrogels have good stretchability but low modulus, shows a certain brittleness, and thus cannot meet the strain requirement at present. For example, Chinese Patent Application No. CN113897011A discloses a preparation method for an impact-resistant flexible protective material, Chinese Patent Application No, CN04862975A discloses a preparation method for shear thickening gel, and Chinese Patent Application No. CN110655072A discloses a shear thickening fluid composite graphene sponge protective material and a preparation method therefor; in the foregoing patents, a shear thickening fluid or gel fluid is prepared first, and then the shear thickening fluid or gel fluid is further compounded with a reinforcing material (such as high-performance fiber) to obtain the impact-resistant flexible material, however, the prepared composite material has poor impact resistance and ball rebound resilience.

SUMMARY

Aiming at the existing problems, the present invention is intended to provide a shear thickening composite material, a preparation method therefor, and use thereof. The shear thickening composite material of the present invention is a solid flexible material, which has high energy absorption, high impact resistance, and low ball rebound resilience.

In order to achieve the above objective, the present invention provides the following technical solutions.

The present invention provides a shear thickening composite material prepared from a premix and a curing agent; wherein
the premix comprises the following components in parts by weight: 30-80 parts of polyether diol, 20-70 parts of polyether polyol, 1-20 parts of a chain extender, 0.5-3 parts of a cross-linking agent, 5-50 parts of a filler, 0.5-5.0 parts of a coupling agent, 0.05-15 parts of a foaming agent, 0.1-5.0 parts of an emulsifier, and 0.05-5.0 parts of a catalyst; a quantity of hydroxyl groups in the polyether polyol is more than 3, and a hydroxyl value of the polyether polyol is 22-56 mgKOH/g;
the curing agent comprises diphenylmethane diisocyanate and/or 1,5-naphthalene diisocyanate; and
a molar ratio of hydroxyl groups in the premix to isocyanate groups in the curing agent is 100:100-110.

Preferably, the polyether diol comprises polyoxypropylene diol and/or polyoxypropylene-oxyethylene polyether diol.

Preferably, the polyether polyol comprises one or more of polyoxypropylene polyol, polyoxyethylene polyol, and polyoxypropylene-oxyethylene copolyol.

Preferably, the chain extender comprises a first chain extender and/or a compound chain extender, the first chain extender comprises one or more of 3-methyl-1,5-pentanedial, 1,4-cyclohexanediol, 4,4'-bis(sec-butyl)-methylendianiline, methylpropanediol, 1,6-hexanediol, 1,4-bis(2-hydroxyethoxy)benzene, ethylene glycol, 1,2-propanediol, 1,3-propanediol, 1,3-butanediol, 1,4-butanediol, diethylene glycol, dipropylene glycol, neopentyl glycol, methyl propylene glycol(2-methyl-1,3-propanediol), and hydroquinone bis(2-hydroxyethyl)ether; and the compound chain extender is prepared from a chain extension reaction of raw materials comprising the first chain extender and a chain extension curing agent.

Preferably, the cross-linking agent comprises an alcohol amine cross-linking agent and/or an alcohol cross-linking agent, the alcohol amine cross-linking agent comprises one or more of ethanolamine, diethanolamine, and triethanolamine, and/or the alcohol cross-linking agent comprises glycerol.

Preferably, the filler comprises one or more of white carbon black, wollastonite powder, kaolin, silica fume, carbon black, and a glass fiber.

Preferably, the coupling agent comprises an amino group-containing silane coupling agent.

Preferably, the emulsifier comprises a polysiloxane-oxyalkylene block copolymer.

The present invention further provides a preparation method for the shear thickening composite material of the foregoing technical solution, which comprises the following steps:
mixing polyether diol, polyether polyol, a chain extender, a cross-linking agent, a filler, a coupling agent, a foaming agent, an emulsifier, and a catalyst to obtain a premix; and
performing foaming, cross-linking, and in-situ integrated molding on the premix and a curing agent to obtain the shear thickening composite material.

The present invention further provides use of the shear thickening composite material of the foregoing technical solution in the field of protection.

In the present invention, the raw materials for preparing the shear thickening composite material comprise polyether diol and polyether polyol, where the polyether diol provides a net-shaped support for a hard segment, and the polyether diol provides buffering energy absorption. When an impact force is large, the net-shaped hard segments contained in the polyether diol are mutually supported and can be quickly aggregated, the characteristics of high impact resistance and high energy absorption are endowed, and the effects of damping, energy absorption, and vibration attenuation are implemented. When the impact force is removed, the polyether diol provides soft segments that can prevent the instantaneous rebound of the hard segment net, so that the shear thickening composite material has lower ball rebound resilience.

According to the present invention, a solid composite material with shear thickening performance is prepared by limiting the types and contents of all components in raw materials. This composite material is kept soft and has a proper elastic shape under a normal state, and can be rapidly subjected to strain enhancement through local density increase when being rapidly and violently impacted or extruded, so that a significant shear thickening phenomenon is presented, namely this material is a hard solid when being impacted by an external force, then this material has an increasing strength with the increase of the external force, and this material restores to an original relaxed, soft, and elastic state when the external force is removed.

The present invention further provides a preparation method for the shear thickening composite material of the foregoing technical solution, and the solid flexible composite material is obtained by an in-situ reinforcement integrated one-step molding process during foaming and cross-linking reaction. The composite material prepared by the present invention is wholly in a stable state, and has the characteristics of impact resistance, being bendable, and high energy consumption. Compared with the existing protective material with suspension liquid or gel liquid as a matrix, in the present invention, the preparation method is simple, multiple process technologies such as solution preparation, pouring, solvent removal, and molding are not required, the problems of easiness in phase separation, easiness in separation, and poor stability in the shear thickening fluid for use in the protective material are avoided, and the development and evolution of cavitation that is easily generated in the liquid cavity penetration process of the fluid protective material is effectively suppressed.

The present invention further provides use of the shear thickening composite material of the foregoing technical solution. The shear thickening composite material is used in the protection field, and the flexible protective material is obtained by molding different molds, so that the shear thickening composite material has extremely low ball rebound resilience and good energy absorption, and has the advantages of light weight, softness, stable performance, portability, easiness in wearing, and comfort.

DETAILED DESCRIPTION OF EMBODIMENTS

The present invention provides a shear thickening composite material prepared from a premix and a curing agent; wherein the premix comprises the following components in parts by weight: 30-80 parts of polyether diol, 20-70 parts of polyether polyol, 1-20 parts of a chain extender, 0.5-3 parts of a cross-linking agent, 5-50 parts of a filler, 0.5-5.0 parts of a coupling agent, 0.05-15 parts of a foaming agent, 0.1-5.0 parts of an emulsifier, and 0.05-5.0 parts of a catalyst; a quantity of hydroxyl groups in the polyether polyol is more than 3, and a hydroxyl value of the polyether polyol is 22-56 mgKOH/g;

the curing agent comprises diphenylmethane diisocyanate and/or 1,5-naphthalene diisocyanate; and a molar ratio of hydroxyl groups in the premix to isocyanate groups in the curing agent is 100:100-110.

In the present invention, unless otherwise specified, all the raw materials used are commercially available in the art.

In the present invention, the parts by weight of the polyether diol in the premix are preferably 50-55 parts.

In the present invention, the polyether diol preferably comprises polyoxypropylene diol and/or polyoxypropylene-oxyethylene polyether diol, and the polyether diol can provide a soft segment chain structure that provides buffering energy absorption and prevents instantaneous rebound of a hard segment net, which enables the shear thickening composite material to have lower ball rebound resilience.

In the present invention, the polyether diol preferably has a weight-average molecular weight of 400-2000, and the hydroxyl value is preferably 56-280 mgKOH/g.

In the present invention, the polyoxypropylene-oxyethylene polyether diol belongs to copolyether diol and can be synthesized from different initiators and monomers. Preferably, the polyoxypropylene-oxyethylene polyether diol and CAS number comprise: polyoxyethylene polyoxypropylene ether 9003-11-6, polyoxypropylene polyoxyethylene copolymer solution 106392-12-5, 2,2-oxybis(ethanol), polymer with methyl oxirane and oxirane 50658-23-6, 4,4'-isopropylidenediphenol, ethoxylated and propoxylated (1-4.5 moles ethoxylated and 1-4.5 moles propoxylated) 52367-02-9, oxirane, methyl-, polymer with oxirane, ether with 4,4-(1-methylethylidene)bisphenol (2:1) 65324-64-3.

Based on the parts by weight of the polyether diol, the parts by weight of the polyether polyol in the premix are preferably 40-45 parts.

In the present invention, the polyether polyol preferably comprises one or more of polyoxypropylene polyol, polyoxyethylene polyol, and polyoxypropylene-oxyethylene copolyol, the polyether polyol is preferably polyether triol, the polyoxypropylene polyol is preferably polyoxypropylene triol, the polyoxyethylene polyol is preferably polyoxyethylene triol, and the polyoxypropylene-oxyethylene copolymer polyol is preferably polyoxypropylene-oxyethylene copolymer triol. The polyether polyol can provide a net-shaped support for a hard segment, when the polyether polyol is subjected to impact force, the net-shaped hard segments are mutually supported and can be quickly aggregated, the characteristics of high impact resistance and high energy absorption of the shear thickening composite material are endowed, and the effects of damping, energy absorption, and vibration attenuation are implemented.

In the present invention, the polyether polyol preferably has a weight-average molecular weight of 1000-12000.

Based on the parts by weight of the polyether diol, the parts by weight of the chain extender in the premix are preferably 8-10 parts.

In the present invention, the chain extender can increase a length of a molecular chain and improve the performance of a product.

In the present invention, the chain extender preferably comprises a first chain extender and/or a compound chain extender. When the chain extender is preferably a mixture of the first chain extender and the compound chain extender, the mass ratio of the first chain extender to the compound chain extender in the mixture is not required in the present invention.

In the present invention, the first chain extender preferably comprises one or more of 3-methyl-1,5-pentanediol, 1,4-cyclohexanediol, 4,4'-bis(sec-butyl)-methylendianiline, methylpropanediol, 1,6-hexanediol, 1,4-bis(2-hydroxyethoxy)benzene, ethylene glycol, 1,2-propanediol, 1,3-propanediol, 1,3-butanediol, 1,4-butanediol, diethylene glycol, dipropylene glycol, neopentyl glycol, methyl propylene glycol(2-methyl-1,3-propanediol), and hydroquinone bis(2-hydroxyethyl)ether.

In the present invention, the compound chain extender is prepared from a chain extension reaction of raw materials comprising the first chain extender and a chain extension curing agent.

In the present invention, the compound chain extender is preferably prepared by a method comprising the following steps:
mixing the first chain extender and/or the first cross-linking agent under vacuum and at a constant temperature to obtain a first component; and
performing chain extension reaction on the first component and a chain extension curing agent to obtain the compound chain extender.

The present invention mixes the first chain extender and/or the first cross-linking agent under vacuum and at a constant temperature to obtain a first component.

In the present invention, when the raw materials of the first component comprise a first chain extender and a first cross-linking agent, the mass ratio of the first chain extender to the first cross-linking agent is preferably 19-9:1.

In the present invention, the first cross-linking agent preferably comprises one or more of ethanolamine, diethanolamine, triethanolamine, and glycerol.

In the present invention, the constant temperature is preferably 60-100° C., more preferably 80° C.

In the present invention, the pressure of the vacuum is preferably −0.06 to −0.1 MPa, more preferably −0.1 MPa.

After the first component is obtained, the present invention performs chain extension reaction on the first component and a chain extension curing agent to obtain the compound chain extender.

In the present invention, the chain extension curing agent preferably comprises diphenylmethane diisocyanate and/or 1,5-naphthalene diisocyanate. When the first curing agent preferably comprises diphenylmethane diisocyanate and 1,5-naphthalene diisocyanate, the present invention has no requirement for the mass ratio of diphenylmethane diisocyanate to 1,5-naphthalene diisocyanate.

In the present invention, the mixing mode is preferably stirring, and the rotation speed of the stirring is preferably 50-150 rpm, more preferably 100 rpm; and the stirring is performed for preferably 6-10 h, more preferably 8 h.

In the present invention, the molar ratio of the hydroxyl group in the first component to the isocyanate group in the first curing agent is preferably 100:10-50, more preferably 100:50.

In the present invention, the chain extension reaction is performed for preferably 6-10 h, more preferably 8 h; and the temperature of the chain extension reaction is preferably 60-100° C., more preferably 80° C.

In the present invention, preferably, a temperature reduction step is further included after the chain extension reaction is completed, and the final temperature of the temperature reduction step is preferably room temperature.

Based on the parts by weight of the polyether diol, the parts by weight of the cross-linking agent in the premix are preferably 0.5-0.6 parts.

In the present invention, the cross-linking agent preferably comprises an alcohol amine cross-linking agent and/or an alcohol cross-linking agent, the alcohol amine cross-linking agent preferably comprises one or more of ethanolamine, diethanolamine, and triethanolamine, and/or the alcohol cross-linking agent preferably comprises glycerol. The cross-linking agent can generate chemical bonds between linear molecules, so that the linear molecules are connected together to form a net-shaped structure, and the strength and the elasticity of the material are improved.

Based on the parts by weight of the polyether diol, the parts by weight of the filler in the premix are preferably 30-35 parts.

In the present invention, the filler preferably comprises one or more of white carbon black, wollastonite powder, kaolin, silica fume, carbon black, and a glass fiber, more preferably white carbon black, and the filler can improve the impact resistance of the material.

Based on the parts by weight of the polyether diol, the parts by weight of the coupling agent in the premix are preferably 1.0-1.5 parts.

In the present invention, the coupling agent preferably comprises an amino group-containing silane coupling agent that ensures that the filler does not fall off or separate.

Based on the parts by weight of the polyether diol, the parts by weight of the foaming agent in the premix are preferably 0.8-1.2 parts.

In the present invention, the foaming agent is preferably a physical foaming agent, the physical foaming agent preferably comprises one or more of $H_2O$, dichloromethane, 1,1,1,3,3-pentafluorobutane, and 1,1-dichloro-1-fluoroethane, the $H_2O$ is preferably deionized water, and the foaming agent plays a foaming role and adjusts a forming density of a product.

Based on the parts by weight of the polyether diol, the parts by weight of the emulsifier in the premix are preferably 2.0-3.0 parts.

In the present invention, the emulsifier preferably comprises a polysiloxane-oxyalkylene block copolymer, and the emulsifier can endow good compatibility with the raw materials.

Based on the parts by weight of the polyether diol, the parts by weight of the catalyst in the premix are preferably 0.5-0.6 parts.

In the present invention, the catalyst preferably comprises one or more of dimethyl ethanol amine, tri ethylenedi amine, 1,8-diazabicyclo[5.4.0]undec-7-ene (DBU), N,N-dimethylcyclohexylamine, bis(2-dimethylaminoethyl)ether, N,N,N', N'-tetramethylalkylenediamine, N,N-dimethylbenzylamine, and an organobismuth catalyst. The catalyst can adjust the starting time, demolding time, and post-curing time of a polymerization reaction.

In the present invention, the catalyst preferably comprises a foaming catalyst and a curing catalyst, where the foaming catalyst is preferably dimethylethanolamine, and the curing catalyst is preferably triethylenediamine.

In the present invention, the outing agent is preferably liquefied diphenylmethane diisocyanate (MDI).

In the present invention, when the curing agent preferably comprises a mixture of diphenylmethane diisocyanate and 1,5-naphthalene diisocyanate, the present invention has no requirement for the mass ratio of diphenylmethane diisocyanate to 1,5-naphthalene diisocyanate.

In the present invention, when the premix comprises the following components in parts by weight: 30-80 parts of polyether diol, 20-70 parts of polyether triol, 1-20 parts of a chain extender, 0.5-3 parts of a cross-linking agent, 5-50 parts of a filler, 0.5-5.0 parts of a coupling agent, 0.05-15 parts of a foaming agent, 0.1-5.0 parts of an emulsifier, and 0.05-5.0 parts of a catalyst, taking the polyether diol as the weight basis of each raw material, the parts by weight of the curing agent are preferably 35-80 parts.

In the present invention, the molar ratio of the hydroxyl group in the premix to the isocyanate group in the curing agent is preferably 100:105.

The present invention further provides a preparation method for the shear thickening composite material of the foregoing technical solution, which comprises the following steps:

mixing polyether diol, polyether polyol, a chain extender, a cross-linking agent, a filler, a coupling agent, a foaming agent, an emulsifier, and a catalyst to obtain a premix; and performing foaming, cross-linking, and in-situ integrated molding on the premix and a curing agent to obtain the shear thickening composite material.

The present invention mixes polyether diol, polyether polyol, a chain extender, a cross-linking agent, a filler, a coupling agent, a foaming agent, an emulsifier, and a catalyst to obtain a premix.

In the present invention, the mixing mode is preferably stirring, the rotation speed of the stirring is preferably 50-200 rpm, the stirring is performed for preferably 30-90 min, more preferably 75 min, and the temperature during stirring is preferably 60-90° C., more preferably 75° C. In a specific embodiment of the present invention, the preparation method for the premix comprises the following steps: putting part of polyether diol into a container, heating to 60-90° C., keeping the stirring speed at 50-200 rpm, sequentially adding the chain extender, the coupling agent, the emulsifier, and the filler, continuously stirring for 30-60 min, and stopping heating; and adding the remaining polyether diol, polyether triol, cross-linking agent, and catalyst, continuously stirring, adding the foaming agent when the temperature is reduced to below 30° C., continuously stirring for 30 min, and stopping stirring to obtain the premix.

In the present invention, the mass ratio of the part of polyether diol to the remaining polyether diol is preferably 20-40:10-60, more preferably 5:2-3.

In the present invention, according to the preparation method for the premix, the emulsifier can fully play an emulsification role so as to ensure that the chain extender, the cross-linking, agent, and the coupling agent are uniformly dispersed, so that the raw materials are uniformly compatible, and meanwhile, the coupling agent is uniformly attached to an outer surface of the filler.

After the premix is obtained, the present invention performs foaming, cross-linking, and in-situ integrated molding on the premix and a curing agent to obtain the shear thickening composite material.

In the present invention, the premix and the curing agent are preferably preheated before the foaming, cross-linking, and in-situ integrated molding, where the preheating temperature of the premix is preferably 15-35° C., more preferably 25° C.; and the preheating temperature of the curing agent is preferably 25-45° C., more preferably 35° C.

According to the present invention, preferably, the premix and the curing agent are stirred at a high speed, and then the obtained mixture is injected into a mold for foaming, cross-linking and in-situ integrated molding, where the rotation speed of the high-speed stirring is preferably 1500-3000 rpm, and the time of the high-speed stirring is preferably 3-8 s. During the foaming, cross-linking, and in-situ integrated molding, raw materials are subjected to polymerization reaction in a mold cavity, chain extension and foaming of molecular chains are started, and the mold cavity of the whole mold is filled with the raw materials, and cross-linking and cud ng are performed.

In the present invention, the temperature of the foaming, cross-linking, and in-situ integrated molding is preferably 35-80° C., more preferably 50-60° C., and the time of the foaming, cross-linking, and in-situ integrated molding is preferably 2 min. The foaming, cross-linking, and in-situ integrated molding generate heat, resulting in a temperature rise.

In the present invention, the foaming, cross-linking and integrated molding preferably further comprise a curing reaction, where the curing temperature is preferably 50-60° C., and the curing time is preferably 2-10 min, more preferably 6-8 min.

According to the present invention, the obtained cured product is preferably placed to obtain the shear thickening composite material, the temperature of the placement is preferably 10-40° C., more preferably 34-36° C., and the time of the placement is preferably 24-72 h, more preferably 24 h.

In the present invention, the integrally formed mold is preferably a cavity with a quick locking function, a top end of the cavity is preferably provided with an exhaust channel, a diameter of the exhaust channel is preferably 0.3-3.0 mm, more preferably 1.0 mm, and the diameter of the exhaust channel can ensure smooth exhaust and prevent excessive overflow of raw materials after polymerization reaction.

The present invention further provides use of the shear thickening composite material of the foregoing technical solution in the field of protection.

The shear thickening composite material is used in the protection field, and the flexible protective material is obtained by molding different molds, so that this material has better energy absorption and vibration reduction performance and better flexibility, is intact after kinetic energy impact, and can implement a better protection effect.

In order to further illustrate the present invention, the shear thickening composite material, the preparation method therefor and use thereof provided by the present invention are described in detail below with reference to the following examples, which, however, should not be construed as limiting the scope of the present invention.

Example 1

A shear thickening protective material (NNF-1) was prepared by the following steps.

1) Preparation of a Compound Chain Extender:

50 g of diethanolamine, 130 g of ethylene glycol, 320 g of 3-methyl-1,5-pentanediol, and 500 g of 1,4-butanediol were sequentially added into a container with a constant temperature of 80° C., stirring was started, the stirring was kept at a rotation speed of 100 rpm, the container was closed, the vacuum was started to remove water, and a negative pressure of −0.1 MPa was kept for 8 h to obtain a first component. The liquefied MDI was slowly added into the first component based on the molar ratio of the hydroxyl group in the first component to the isocyanate group in the liquefied MDI of 100:50 for polymerization chain extension reaction for 8 h, heating and stirring were stopped, and the materials were cooled to room temperature to obtain the (NNF-1) compound chain extender.

2) Preparation of a Premix:

500 g of 1000-molecular-weight polyether diol was added into a container with a constant temperature of 75° C.; stirring was started at a rotation speed at 100 rpm, and then 100 g of the NNF-1 compound chain extender in the step 1), 20 g of a silane coupling agent (XIAMETER™ OFS-6020 Silane), 10 g of a polysiloxane-oxyalkylene block copolymer emulsifier, and 200 g of nano white carbon black (AEROSIL, 200) were added; the mixture was continuously stirred for 45 min, the heating was stopped, 200 g of 2000-molecular-weight polyether diol, 300 g of 5000-molecular-weight polyether triol, 10 g of triethanolamine, 8 g of the foaming catalyst dimethylethanolamine, and 5 g of the curing catalyst triethylenediamine were added, and the mixture was continuously stirred; and when the temperature was reduced to 30° C., 2.5 g of the foaming agent (deionized water) was added; and stirring was stopped after stirring was kept for 30 min to obtain the premix, and the temperature was controlled at 25° C. In this example, the polyether diol was WANOL® C201.0, and the polyether triol was 330N.

3) Preparation of a Curing Agent:

Based on the molar ratio of hydroxyl groups in the premix to isocyanate groups in the curing agent of 100:105, the liquefied MDI was calculated and weighed and added into another container, and the temperature was controlled at 35° C.

4) Preparation of the Shear Thickening Protective Material (NNF-1) by Reaction In-Situ Integrated Molding A knee-pad mold with a quick locking function (for installing a quick mold-locking fixture) was selected, an exhaust channel with a diameter of 1.0 mm was opened at the uppermost end (highest point) of the whole cavity of the mold, the temperature of the mold was controlled at 50° C., and a demolding agent was uniformly sprayed on a surface of the mold cavity for later use. The premix and the curing agent were mixed at a high speed (1500 rpm) for 3 s and then injected into a lower mold cavity of a mold, the upper mold of the mold was covered, the upper and lower molds were locked and fixed by the quick locking device to form a complete mold cavity, the raw materials were polymerized in the mold cavity, the chain extension and foaming of molecular chains were started, the mold cavity of the whole mold was filled, and cross-linking and curing were performed. The raw materials were cured and reacted in a mold cavity for 8 min, the mold was opened, the product was taken out and placed in an environment with a temperature of 34° C. for 24 h, and the foaming polyurethane composite material in a size of a length×a width×a height (100 mm×100 mm×20 mm) and with shear thickening, energy absorption, vibration reduction, and damping functions was obtained.

Example 2

A shear thickening protective material (NNT-2) was prepared by the following steps.

1) Preparation of a Compound Chain Extender:

100 g of diethanolamine, 500 g of dipropylene glycol, 280 g of 4,4'-bis(svc-butyl)-methylendianiline and 120 g of ethylene glycol were sequentially added into a container with a constant temperature of 80° C. The stirring was started, the stirring was kept at a rotation speed of 100 rpm, the container was closed, the vacuum was started to remove water, and a negative pressure of −01 MPa was kept for 8 h to obtain a first component. The NDI was slowly added into the first component based on the molar ratio of the hydroxyl group in the first component to the isocyanate group in the liquefied MDI of 100:50 for polymerization chain extension reaction for 8 h, heating and stirring were stopped, and the materials were cooled to room ter temperature to obtain the (NNF-2) compound chain extender.

2) Preparation of a Premix:

500 g of 400-molecular-weight polyether diol was added into a container with a constant temperature of 75° C.; stirring was started at a rotation speed at 100 rpm, and then 100 g of the NNF-2 compound chain extender in the step 1), 40 g of a silane coupling agent (XIAMETER™ OFS-6020 Silane), 20 g of a polysiloxane-oxyalkylene block copolymer emulsifier, and 400 g of nano white carbon black (AEROSIL 200) were added; the mixture was continuously stirred for 45 min, the heating was stopped, 300 g of 2000-molecular-weight polyether diol, 200 g of 7000-molecular-weight polyether triol, 15 g of triethanolamine, 10 g of the foaming catalyst dimethylethanolamine, and 8 g of the curing catalyst triethylenediamine were added, and the mixture was continuously stirred; and when the temperature was reduced to 60° C., 4 g of the foaming agent (deionized water) was added; and stirring was stopped after stirring was kept for 30 min to obtain the premix, and the temperature was controlled at 25° C. In this example, the polyether diol was Arcol 1003, and the polyether triol was Arcol PPG 1376.

3) Preparation of a Curing Agent:

Based on the molar ratio of hydroxyl groups in the premix to isocyanate groups in the curing agent of 100:105, the liquefied MDI was calculated and weighed and added into another container, and the temperature was controlled at 35° C.

4) Preparation of the Shear Thickening Protective Material (NNF-2) by Reaction In-Situ Integrated Molding A back-pad mold with a quick locking function (for installing a quick mold-locking fixture) was selected, an exhaust channel with a diameter of 1.0 mm was opened at the uppermost end (highest point) of the whole cavity of the mold, the temperature of the mold was controlled at 60° C., and a demolding agent was uniformly sprayed on a surface of the mold cavity for later use. The premix and the curing agent were mixed at a high speed (3000 rpm) for 3 s and then injected into a lower mold cavity of a mold, the upper mold of the mold was quickly covered, the upper and lower molds were locked and fixed by the quick locking device to form a complete mold cavity, the raw materials were polymerized in the mold cavity, the chain extension and foaming of molecular chains were started, the mold cavity of the whole mold was filled, and cross-linking and curing were performed. The raw materials were cured and reacted in a mold cavity for 6 min, the mold was opened, the product was taken out and placed in an environment with a temperature of 34° C. for 24 ii, and the flexible foaming polyurethane composite material in a size of a length×a width×a height (100 mm×100 mm×20 mm) and with shear thickening, energy absorption, vibration reduction, and damping functions was obtained.

Example 3

A shear thickening protective material (NNF-3) was prepared by the following steps.

1) Preparation of a Compound Chain Extender:

500 g of diethylene glycol, 280 g of 1,4-cyclohexanediol, and 22.0 g of ethylene glycol were sequentially added into a container with a constant temperature of 80° C. The stirring was started, the stirring was kept at a rotation speed of 100 rpm, the container was closed, the vacuum was started to remove water, and a negative pressure of −0.1 MPa was kept for 8 h to obtain a first component. The liquefied MDI was slowly added into the first component based on the molar ratio of the hydroxyl group in the first component to the isocyanate group in the liquefied MDI of 100:50 for polymerization chain extension reaction for 8 h, heating and stirring were stopped, and the materials were cooled to room temperature to obtain the (NNF-3) compound chain extender.

2) Preparation of a Premix:

500 g of 700-molecular-weight polyether diol was added into a container with a constant temperature of 75° C.; stirring was started at a rotation speed at 100 rpm, and then 100 g of the NNF-3 compound chain extender in the step 1), 10 g of a silane coupling agent (XIAMETER™ OFS-6020 Silane), 10 g of a polysiloxane-oxyalkylene block copolymer emulsifier, and 100 g of nano white carbon black (AEROSIL 200) were added; the mixture was continuously stirred for 45 min, the heating was stopped, 200 g of 2000-molecular-weight polyether diol, 300 g of 6000-molecular-weight polyether triol, 15 g of triethanolamine, 15 g of the foaming catalyst dimethylethanolamine, and 6 g of the curing catalyst triethylenediamine were added, and the mixture was continuously stirred; and when the temperature was reduced to 60° C., 6 g of the foaming agent (deionized water) was added; and stirring was stopped after stirring was kept for 30 min to obtain the premix, and the temperature was controlled at 25° C. In this example, the polyether diol was Arcol 1007, and the polyether triol was Konix KE-810.

3) Preparation of a Curing Agent:

Based on the molar ratio of hydroxyl groups in the premix to isocyanate groups in the curing agent of 100:105, the liquefied MDI was calculated and weighed and added into another container, and the temperature was controlled at 35° C.

4) Preparation of the Shear Thickening Protective Material (NNF-3) by Reaction In-Situ Integrated Molding A chest-pad mold with a quick locking function (for installing a quick mold-locking fixture) was selected, an exhaust channel with a diameter of 1.0 mm was opened at the uppermost end (highest point) of the whole cavity of the mold, the temperature of the mold was controlled at 50° C., and a demolding agent was uniformly sprayed on a surface of the mold cavity for later use. The premix and the curing agent were mixed at a high speed (3000 rpm) for 3 s and then injected into a lower mold cavity of a mold, the upper mold of the mold was quickly covered, the upper and lower molds were locked and fixed by the quick locking device to form a complete mold cavity, the raw materials were polymerized in the mold cavity, the chain extension and foaming of molecular chains were started, the mold cavity of the whole mold was filled, and cross-linking and curing were performed. The raw materials were cured and reacted in a mold cavity for 10 min, the mold was opened, the product was taken out and placed in an environment with a temperature of 34° C. for 24 h, and the flexible foaming polyurethane composite material in a size of a length×a width×a height (100 mm×100 mm×20 mm) and with shear thickening, energy absorption, vibration reduction, and damping functions was obtained.

Test Example 1

The samples of the shear thickening composite materials prepared in Examples 1 to 3 were subjected to ball rebound (GB/T 6670-1997) and high and low temperature impact resistance tests (EN 1621-1:2012), and compared with a control sample in the same size (a length×a width×a height=100 mm×100 mm 20 mm), The results are shown in Table 1, where the density of the test sample was 0.3 g/cm³.

TABLE 1

Comparison parameter table for ball rebound and impact resistance and energy absorption (transmitted force)

| Types of materials | Example 1 | Example 2 | Example 3 | Polyurethane high-rebound foam protective material | Polyurethane slow-rebound foam protective material | Ethylene-vinyl acetate copolymer foam protective material | SBR foam protective material | Polyethylene foam protective material |
|---|---|---|---|---|---|---|---|---|
| Ball rebound % | 6.5 | 5.8 | 7.0 | 35.8 | 13.8 | 33.5 | 44.8 | 56.2 |
| Impact attenuation (KN) at a room temperature | 15.5 | 13.8 | 16.3 | 38.9 | 32,9 | 40.6 | 41.1 | 36.5 |
| Impact attenuation (KN) after hydrolysis aging at a high temperature of 70° C. | 14.5 | 10.6 | 14.8 | 38.3 | 33.4 | 42.1 | 44.8 | 37.3 |
| Impact attenuation (KN) at −10° C. | 10.6 | 9.7 | 10.9 | 37.6 | 28.3 | 33.2 | 39.3 | 33.9 |
| Impact attenuation (KN) at 40° C. | 18.9 | 18.4 | 19.8 | 40.2 | 45.2 | 43.7 | 41.9 | 37.3 |

It can be seen from the results in Table 1, the conventional foaming polyurethane, PE copolymer and other foaming products have high ball rebound and low impact force attenuation the shear thickening foaming polyurethane has extremely low ball rebound, has great attenuation to impact force under the conditions of high temperature, low temperature, hydrolytic aging, and the like, and has excellent impact resistance. That is, the shear thickening composite material has wide application environment and can play a better protection effect in different environments.

Test Example 2

The samples of the shear thickening composite materials prepared in Examples 1 to 3 were subjected to a test of 500 g load and 10 J kinetic energy impact, and compared with a control sample in the same size (a length×a width×a height=100 mm×100 mm×20 mm), and the density of the test sample was 0.3 g/cm³. The results are shown in Table 2.

technical conditions are adopted for comparison experiments on foaming products such as conventional foaming polyurethane, EVA, and SBR, when the load mass is 500 g/cm² and the force is applied for 120 s (the applied force is small for a long time), these products have lower indentation ratios (displacement ratios), and when 10 J impact force (instantaneous strong impact force) is given, the indentation ratios (displacement ratios) of these products immediately rise to 100% (completely breakdown), and the appearance is severely damaged and even these products are punched, which indicates that the common protective material does not have shear thickening effect. The shear thickening composite material of the present invention has high shear thickening effect and proper recovery time, namely has better energy absorption and vibration reduction performance and better flexibility, is intact after kinetic energy impact, can play a better protection effect, and meets the requirements of military and civil protective materials.

TABLE 2

Comparison table of indentation (displacement %) under 500 g load and 10 J kinetic energy impact

| Types of materials | Example 1 | Example 2 | Example 3 | Polyurethane high-rebound foam protective material | Polyurethane slow-rebound foam protective material | Ethylene-vinyl acetate copolymer foam protective material | SBR foam protective material | Polyethylene foam protective material |
|---|---|---|---|---|---|---|---|---|
| Load mass: 500 g/cm², Force applied for: 120 s, Indentation ratio (displacement ratio) % | 68.3 | 65.8 | 70.1 | 8.7 | 39.2 | 3.1 | 14.3 | 5.7 |
| After the load is removed, the time (s) for recovering the indentation | 4.3 | 3.8 | 5.7 | 0.01 | 8 | 1.1 | 2.5 | 3.7 |
| Indentation ratio (displacement ratio) % under impact of 10 J energy | 10.3 | 8.9 | 12.3 | 95.1 | 97.9 | 100 | 100 | 100 |
| Appearance of material after impact of 10 J energy | Intact | Intact | Intact | Severely damaged | Severely damaged | Punched and burnt | Punched and burnt | Punched and burnt |

It can be seen from the results in Table 2 that when the load mass is 500 g/cm² and the force is applied for 120 s (the applied force is small for a long time), the shear thickening composite materials NNF-1, NNF-2, and NNF-3 of the present invention have a large indentation ratio (displacement ratio); when the material of the present invention is subjected to an instantaneous impact of an impact force of 10 J (an instantaneous strong impact force), the shear thickening composite material of the present invention has a lower indentation ratio (displacement ratio), and when the impact force is removed, the shear thickening composite material of the present invention is intact, which indicates that the shear thickening composite material of the present invention has a strong shear thickening effect; the same Example 4

This example is different from Example 1 only in that a shin guard mold is used in the step 4).

Test Example 3

High Energy Absorption and High Impact Resistance Performance

The protective material prepared by using the shin guard mold in Example 4 passed the impact performance test of NOCSAE DOC (ND) 090-06m18 of ICS (NOCSAE: National Operating Committee on Standards for Athletic Equipment), which indicates that this material meets the standards for use by international athletes. The impact performance test results are shown in Table 3, and the three drop velocities and the average impact peak forces of the same test point of the shin guard are recorded. The protective material prepared by the shin guard mold passed the EN 13061 transmitted force test, and the transmitted force of the multiple impact points of the shin guard was only 0.2-0.4 KN, which was far less than the standard of 2.0 KN, as shown in the transmitted force test result in Table 4.

TABLE 3

Impact performance test results

| Drop Velocity (m/s) | Acceleration (g) |
|---|---|
| Pre-System Check | |
| 5.41 | 384 |
| 5.42 | 384 |
| Post-System Check | |
| 5.42 | 384 |
| 5.44 | 384 |
| 5.43 | 384 |

Table 4. Penetration Force Test Results
Requirement:
The transmitted force of the three single impacts to the same point on three shin guards shall not exceed 2.0 kN in the central or lateral test areas.

| Impact Point No. | Location | Mean peak transmitted force | P | F | N/A |
|---|---|---|---|---|---|
| B1 | Central | 0.3 kN | √ | | |
| B2 | Central | 0.3 kN | √ | | |
| B3 | Central | 0.3 kN | √ | | |
| B4 | Lateral | 0.2 kN | √ | | |
| B5 | Lateral | 0.4 kN | √ | | |
| B6 | Lateral | 0.4 kN | √ | | |

Environmental Protection and Safety

The protective material prepared by using the shin guard mold in Example 4 passed the tests of REACH225 and ROHS 2.0 of SGS, where ROHS is an environmental protection detection report, and ROHS directive specifies that the electronic and electrical equipment contains forbidden substances, which list six hazardous substances, including: lead pb (1000 PPM limit) cadmium Cd (100 PPM), mercury Hg (1000 PPM limit), hexavalent chromium $Cr^{6+}$ (1000 PPM limit), polybrominated diphenyl ethers PBDE (1000 PPM limit), polybrominated biphenyls (1000 PPM limit). REACH (SV IC report) is a substance of high concern in the European Union. The currently detected SVHC has 151 hazardous substances, and the content of each SVHC cannot exceed 0.1%. The environmentally harmful substances and the heavy metal content of the shear thickening composite material of the present invention meet the standard requirements.

Example 5

A shear thickening protective material (NNF-4) was prepared by the following steps.
1) Preparation of a Premix:
500 g of 1000-molecular-weight polyether diol was added into a container; stirring was started at a rotation speed at 100 rpm, and then the chain extender (80 g of 1,4-butanediol), 20 g of a silane coupling agent (XIAMETER™ OFS-6020 Silane), 10 g of a polysiloxane-oxyalkylene block copolymer emulsifier, and 200 g of nano white carbon black (AEROSIL 200) were added; the mixture was continuously stirred for 45 min, 200 g of 2000-molecular-weight polyether diol, 300 g of 5000-molecular-weight polyether triol, 10 g of triethanolamine, 8 g of the foaming catalyst dimethylethanolamine, and 5 g of the curing catalyst triethylenediamine were added; 2.5 g of the foaming agent (deionized water) was added; and stirring was stopped after stirring was kept for 30 min to obtain the premix, and the temperature was controlled at 25° C. In this example, the polyether diol was WANOL® C2010, and the polyether triol was 330N.
2) Preparation of a Curing Agent:
Based on the molar ratio of hydroxyl groups in the premix to isocyanate groups in the curing agent of 100:105, the liquefied MDI was calculated and weighed and added into another container, and the temperature was controlled at 35° C.
3) Preparation of the Shear Thickening Protective Material (NNF-4) by Reaction In-Situ Integrated Molding A knee-pad mold with a quick locking function (for installing a quick mold-locking fixture) was selected, an exhaust channel with a diameter of 1.0 mm was opened at the uppermost end (highest point) of the whole cavity of the mold, the temperature of the mold was controlled at 50° C., and a demolding agent was uniformly sprayed on a surface of the mold cavity for later use. The raw materials of the premix and the curing agent were mixed at a high speed (1500 rpm) for 3 s and then injected into a lower mold cavity of a mold, the upper mold of the mold was quickly covered, the upper and lower molds were locked and fixed by the quick locking device to form a complete mold cavity, the raw materials were polymerized in the mold cavity, the chain extension and foaming of molecular chains were started, the mold cavity of the whole mold was filled, and cross-linking and curing were performed. The raw materials were cured and reacted in a mold cavity for 8 min, the mold was opened, the product was taken out and placed in an environment with a temperature of 34° C. for 24 h, and the flexible solid composite material with shear thickening, energy absorption, vibration reduction, and damping functions was obtained.

Example 6

A shear thickening protective material (NNF-5) was prepared by the following steps.
1) Preparation of a Premix:
500 g of 400-molecular-weight polyether diol was added into a container; stirring was started at a rotation speed at 100 rpm, and then the chain extender (80 g of dipropylene glycol), 40 g of a silane coupling agent (XIAMETER™ OFS-6020 Silane), 20 g of a polysiloxane-oxyalkylene block copolymer emulsifier, and 400 g of nano white carbon black (AEROSIL 200) were added; the mixture was continuously stirred for 45 min, 300 g of 2000-molecular-weight polyether diol, 200 g of 8000-molecular-weight polyether triol, 15 g of triethanolamine, 10 g of the foaming catalyst dimethylethanolamine, and 8 g of the curing catalyst triethylenediamine were added; 4 g of the foaming agent (deionized water) was added; and stirring was stopped after stirring was kept for 30 min to obtain the premix, and the temperature was controlled at 25° C. In this example, the polyether diol was WANOL® C2010, and the polyether triol was 330N.

2) Preparation of a Curing Agent:

Based on the molar ratio of hydroxyl groups in the premix to isocyanate groups in the curing agent of 100:105, the liquefied MDI was calculated and weighed and added into another container, and the temperature was controlled at 35° C.

3) Preparation of the Shear Thickening Protective Material (NNF-5) by Reaction In-Situ Integrated Molding A back-pad mold with a quick locking function (for installing a quick mold-locking fixture) was selected, an exhaust channel with a diameter of 1.0 mm was opened at the uppermost end (highest point) of the whole cavity of the mold, the temperature of the mold was controlled at 50° C., and a demolding agent was uniformly sprayed on a surface of the mold cavity for later use. The premix and the curing agent were mixed at a high speed (3000 rpm) for 3 s and then injected into a lower mold cavity of a mold, the upper mold of the mold was quickly covered, the upper and lower molds were locked and fixed by the quick locking device to form a complete mold cavity, the raw materials were polymerized in the mold cavity, the chain extension and foaming of molecular chains were started, the mold cavity of the whole mold was filled, and cross-linking and curing were performed. The raw materials were cured and reacted in a mold cavity for 6 min, the mold was opened, the product was taken out and placed in an environment with a temperature of 34° C. for 24 h, and the flexible solid composite material with shear thickening, energy absorption, vibration reduction, and damping functions was obtained.

Example 7

A shear thickening protective material (NNF-6) was prepared by the following steps.

1) Preparation of a Premix A:

500 g of 700-molecular-weight polyether diol was added into a container; stirring was started at a rotation speed at 100 rpm, and then the chain extenders (50 g of 4,4'-bis(see-butyl)-methylendianiline and 50 g of diethylene glycol), 10 g of a silane coupling agent (XIAMETER™ OFS-6020 Silane), 10 g of a polysiloxane-oxyalkylene block copolymer emulsifier, and 100 g of nano white carbon black (AEROSIL 200) were added; the mixture was continuously stirred for 45 min, 200 g of 2000-molecular-weight polyether diol, 300 g of 6000-molecular-weight polyether triol, 15 g of triethanolamine, 15 g of the foaming catalyst dimethylethanolamine, and 6 g of the curing catalyst triethylenediamine were added; 6 g of the foaming agent (deionized water) was added; and stirring was stopped after stirring was kept for 30 min to obtain the premix, and the temperature was controlled at 25° C. In this example, the polyether diol was WANOL® 02010, and the polyether triol was 330N.

2) Preparation of Raw Materials of the Component B:

Based on the molar ratio of hydroxyl groups in the premix to isocyanate groups in the curing agent of 100:105, the liquefied MDI was calculated and weighed and added into another container, and the temperature was controlled at 35° C.

3) Preparation of the Shear Thickening Protective Material (NNF-6) by Reaction In-Situ Integrated Molding A chest-pad mold with a quick locking function (for installing a quick mold-locking fixture) was selected, an exhaust channel with a diameter of 1.0 mm was opened at the uppermost end (highest point) of the whole cavity of the mold, the temperature of the mold was controlled at 50° C., and a demolding agent was uniformly sprayed on a surface of the mold cavity for later use. The premix and the curing agent were mixed at a high speed (3000 rpm) for 3 s and then injected into a lower mold cavity of a mold, the upper mold of the mold was quickly covered, the upper and lower molds were locked and fixed by the quick locking device to form a complete mold cavity, the raw materials were polymerized in the mold cavity, the chain extension and foaming of molecular chains were started, the mold cavity of the whole mold was filled, and cross-linking and curing were performed. The raw materials were cured and reacted in a mold cavity for 10 min, the mold was opened, the product was taken out and placed in an environment with a temperature of 34° C. for 24 h, and the flexible solid composite material with shear thickening, energy absorption, vibration reduction, and damping functions was obtained.

Test Example 4

The samples of the shear thickening composite materials prepared in Examples 5 to 7 were subjected to ball rebound (GB/T 6670-1997) and high and low temperature impact resistance tests (EN 1621-1:2012), and the results are shown in Table 5.

TABLE 5

Comparison parameter table for ball rebound and impact resistance and energy absorption (transmitted force) of the shear thickening composite materials prepared in Examples 5 to 7

| Types of materials | Shear thickening protective material (NNF-4) | Shear thickening protective material (NNF-5) | Shear thickening protective material (NNF-6) |
|---|---|---|---|
| Size, length × width × height (mm) | 100 × 100 × 20 | 100 × 100 × 20 | 100 × 100 × 20 |
| Density, g/cm$^3$ | 0.3 | 0.3 | 0.3 |
| Ball rebound % | 4.8 | 4.5 | 4.0 |
| Test for impact attenuation (KN) at a room temperature | 17.2 | 15.6 | 18.0 |
| Test for impact attenuation (KN) after hydrolysis aging at a high temperature of 70° C. | 15.3 | 14.6 | 16.9 |
| Test for impact attenuation (KN) at −10° C. | 12.3 | 11.9 | 12.6 |
| Test for impact attenuation (KN) at 40° C. | 21.7 | 20.0 | 23.2 |

Test Example 5

The samples of the shear thickening composite materials prepared in Examples 5 to 7 were subjected to a test of 500 g load and 10 J kinetic energy impact, and the results are shown in Table 6,

TABLE 6

Comparison table of indentation (displacement %) of the shear thickening composite materials prepared in Examples 5 to 7 under 500 g load and 10 J kinetic energy impact

| Types of materials | Shear thickening protective material (NNF-4) | Shear thickening protective material (NNF-5) | Shear thickening protective material (NNF-6) |
|---|---|---|---|
| Size, length × width × height (mm) | 100 × 100 × 20 | 100 × 100 × 20 | 100 × 100 × 20 |
| Density, g/cm³ | 0.3 | 0.3 | 0.3 |
| Load mass: 500 g/cm², Force applied for: 120 s, Indentation ratio (displacement ratio) % | 70.4 | 67.5 | 73.3 |
| After the load is removed, the time (s) for recovering the indentation | 6.7 | 6.3 | 7.9 |
| Indentation ratio (displacement ratio) % under impact of 10 J energy | 13.8 | 11.7 | 15.9 |
| Appearance of material after impact of 10 J energy | Intact | Intact | Intact |

Although the present invention has been described in detail with reference to the foregoing examples, the foregoing examples are merely a part rather than all of examples of the present invention. Other examples may be further Obtained by those skilled in the art according to the examples of the present invention without creative efforts, and these embodiments all belong to the protection scope of the present invention.

What is claimed is:

1. A shear thickening composite material, prepared from a premix and a curing agent; wherein
the premix comprises the following components in parts by weight: 30-80 parts of polyether diol, 20-70 parts of polyether polyol, 1-20 parts of a chain extender, 0.5-3 parts of a cross-linking agent, 5-50 parts of a filler, 0.5-5.0 parts of a coupling agent, 0.05-15 parts of a foaming agent, 0.1-5.0 parts of an emulsifier, and 0.05-5.0 parts of a catalyst; a quantity of hydroxyl groups in the polyether polyol is more than 3, and a hydroxyl value of the polyether polyol is 22-56 mgKOH/g;
the curing agent is diphenylmethane diisocyanate and/or 1,5-naphthalene diisocyanate; and
a molar ratio of hydroxyl groups in the premix to isocyanate groups in the curing agent is 100:105.

2. The shear thickening composite material according to claim 1, wherein the polyether diol comprises polyoxypropylene diol and/or polyoxypropylene-oxyethylene polyether diol.

3. The shear thickening composite material according to claim 1, wherein the polyether polyol comprises one or more of polyoxypropylene polyol, polyoxyethylene and polyoxypropylene-oxyethylene copolyol.

4. The shear thickening composite material according to claim 1, wherein the chain extender comprises a first chain extender and/or a compound chain extender, the first chain extender comprises one or more of 3-methyl-1,5-pentanediol, 1,4-cyclohexanediol, 4,4'-bis(sec-butyl)-methylendianiline, methylpropanediol, 1,6-hexanediol, 1,4-bis(2-hydroxyethoxy)benzene, ethylene glycol, 1,2-propanediol, 1,3-propanediol, 1,3-butanediol, 1,4-butanediol, diethylene glycol, dipropylene glycol, neopentyl glycol, methyl propylene glycol(2-methyl-1,3-propanediol), and hydroquinone bis(2-hydroxyethyl)ether; and the compound chain extender is prepared from a chain extension reaction of raw materials comprising the first chain extender and a chain extension curing agent.

5. The shear thickening composite material according to claim 1, wherein the cross-linking agent comprises an alcohol amine cross-linking agent and/or an alcohol cross-linking agent, the alcohol amine cross-linking agent comprises one or more of ethanolamine, diethanolamine, and triethanolamine, and/or the alcohol cross-linking agent comprises glycerol.

6. The shear thickening composite material according to claim 1, wherein the filler comprises one or more of white carbon black, wollastonite powder, kaolin, silica fume, carbon black, and a glass fiber.

7. The shear thickening composite material according to claim 1, wherein the coupling agent comprises an amino group-containing silane coupling agent.

8. The shear thickening composite material according to claim 1, wherein the emulsifier comprises a poly siloxane-oxyalkylene block copolymer.

9. A preparation method for the shear thickening composite material according to claim 1, comprising the following steps:
mixing 30-80 parts of polyether diol, 20-70 parts of polyether polyol, 1-2.0 parts of a chain extender, 0.5-3 parts of a cross-linking agent, 5-50 parts of a filler, 0.5-5.0 parts of a coupling agent, 0.05-15 parts of a foaming agent, 0.1-5.0 parts of an emulsifier, and 0.05-5.0 parts of a catalyst to obtain a premix;
a quantity of hydroxyl groups in the polyether polyol is more than 3, and a hydroxyl value of the polyether polyol is 22-56 mgKOH/g; the curing agent is diphenylmethane diisocyanate and/or 1,5-naphthalene diisocyanate; a molar ratio of hydroxyl groups in the premix to isocyanate groups in the curing agent is 100:105; and
performing foaming, cross-linking, and in-situ integrated molding on the premix and a curing agent to obtain the shear thickening composite material.

* * * * *